UNITED STATES PATENT OFFICE.

GEORGE H. EARP-THOMAS, OF GLEN RIDGE, NEW JERSEY.

BACTERIAL PRODUCT AND PROCESS OF PREPARING SAME.

1,252,332.   Specification of Letters Patent.   Patented Jan. 1, 1918.

No Drawing.   Application filed March 30, 1917. Serial No. 158,625.

*To all whom it may concern:*

Be it known that I, GEORGE H. EARP-THOMAS, formerly a citizen of New Zealand, but who have declared my intention of becoming a citizen of the United States, residing at Glen Ridge, in the county of Essex and State of New Jersey, have invented certain new and useful Improvements in Bacterial Products and Processes of Preparing Same; and I do hereby declare the following to be a full, clear, and exact description of the invention, such as will enable others skilled in the art to which it appertains to make and use the same.

This invention relates to bacterial products and processes of preparing same; and in particular it relates to bacterial products comprising inoculated material, most desirably in the form of grains or granules, coated or covered with a protective substance in such manner as to afford protection to said inoculated material from injury or contamination to which it may be exposed by reason of its environment. The invention is especially useful when it is desirable to associate a bacterial culture with material of such character or chemical reaction as would exercise an injurious or unfavorable effect on the unprotected culture.

The difficulty of preventing infection or contamination of bacterial cultures by foreign micro-organisms, especially when the cultures are to be used or kept outside of a laboratory or transported from place to place, is well known. Many types of bacteria such as the nitrogen-gathering or nitrogen-fixing bacteria (*Pseudomonas radicicola*) infesting the roots of legumes, for example, are aerobic, and hence any means adapted for exclusion of foreign and harmful micro-organisms from culture of such bacteria must nevertheless permit access of air to the cultures. For the convenient commercial storage and transport of such cultures *en masse*, a container of the character disclosed in my Patent 1,137,388 of April 27, 1915, has proved eminently satisfactory in practice; but, as will hereinafter appear, it is sometimes desirable to transport or to employ such a culture in the form of relatively small discrete bodies, pieces, or granules, and in such cases the present invention can be practised to great advantage.

In accordance with the present invention, a body consisting of or comprising a bacterial culture is protected from infection and contamination by providing said body with an adherent protective coating of a suitable substance which in itself is substantially indifferent toward the culture, or which at any rate does not deleteriously affect the same, said substance being of such nature as to shield the culture from contact with substances to which it would otherwise be exposed by reason of its environment. More particularly, the invention is directed to protecting in this way small bodies, particles, or granules, of suitable material which has been inoculated with beneficial micro-organisms, such as beneficial soil bacteria. As typical of such beneficial soil bacteria may be mentioned ammonifying bacteria, which convert the insoluble nitrogen of organic matter into ammonia; nitrifying bacteria, (*e. g. Nitrosomonas*) which convert ammonia into nitrous acid; nitrate bacteria (nitrobacter), which carry the oxidation to the nitrate stage; and nitrogen-fixing bacteria, both symbiotic (*e. g. Pseudomonas radicicola*) and non-symbiotic (azotobacter); as well as other bacteria which I have found to grow vigorously in nitrogen-free media and which are useful in soil improvement, but which have not all been individually isolated and identified. An especially desirable result attainable by means of my invention is that granular inoculated material, provided with a protective coating of the general character described, can be mixed with other fertilizer materials, especially with chemical fertilizers having an acid or basic reaction of such character or intensity as would interfere with or inhibit the growth and development of unprotected beneficial micro-organisms. Cultures coated in accordance with the invention retain their activity and virulence unimpaired under conditions which would destroy or seriously affect cultures not thus protected.

While particular advantages are realized in applying the principles of the invention to the manufacture of mixed fertilizers in the manner mentioned, it is to be understood that the invention is capable of other applications, as will appear more fully hereinafter, and that it is therefore not limited to the fertilizer art. In order to explain the principles of the invention more fully by way of a concrete example, however, the application thereof to the preparation of a mixed fertilizer will be described in detail.

Cultures of bacteria suitable for use in practising the present invention may be prepared in any suitable way, but the methods described in my prior Patents 816,850 and 865,965 are especially desirable. Pure cultures or mixed cultures of bacteria or other micro-organisms, having thus been prepared in any suitable manner, and most advantageously in a highly virulent condition, are used for the inoculation of specially prepared fine granular material which has been thoroughly mixed and dried out to a desirable point, which point is, however, considerably short of complete desiccation. This granular material is desirably a substance such as peat, humus, or muck, which may be generically termed humus material or humus-like material, although any other suitable material for the growth of bacteria may be employed, such as comminuted wood fiber for example. For several reasons, humus material is especially valuable for the purposes in view. It is nitrogen-free in the sense that it contains substantially no nitrogen in a form directly available to nitrobacteria; and this is important in maintaining the bacteria virulent. On the other hand, it contains nitrogen in insoluble form which is convertible into ammonia, and therefore eventually made available, by ammonifying bacteria, especially in the presence of suitable basic or antacid substances. Furthermore, humus material is naturally very high in hydroscopic moisture content which it retains tenaciously, samples of peat which have been thoroughly air-dried very commonly containing from 20 to 40 per cent. of hydroscopic moisture. Since a moist medium is essential to continued virulence of bacteria, this characteristic of humus material is of very great importance for present purposes.

If not in itself adapted to serve as food for bacteria, the granular carrier material can be made suitable for the growth of the bacteria by impregnating or otherwise supplying it with soluble nutrients, such as malt sugar, sucrose, etc., and adding certain inorganic agents such as potassium phosphate, magnesium sulfate, wood ashes, all compounded to suit the particular type of micro-organisms to be grown. The granulated carrier is inoculated before or after addition of nutrients with the prepared pure or mixed cultures by methods well known in the art, and the material is then treated with a suitable protective material in such manner as to provide the bacteria with the requisite protection. As protective agents, a large number of materials are satisfactory and readily available. Speaking generally, it is desirable that the coating agent employed be such as will give a very thin tough and closely adherent coating. Agar-agar, and the seaweed jellies generally, give this type of coating and are therefore especially well adapted for the purpose. Among other coating and binding agents useful under certain circumstances in carrying out the invention may be mentioned colloidal material generally, so-called soluble celluloses, gums, resins, waxes, carbohydrates including starches, dextrin, glucose, etc., gelatin, glue, clays and the like. These coating agents may be used individually or in various combinations. Thus, for example, a compound coating of gums or glues and a syrup has certain advantages; and a mixture of waxes and syrups works well.

These various coating agents give coatings whose permeability to air, while differing considerably is sufficient for the purposes of the invention. Aerobic bacteria, when grown in a confined space, soon reduce the pressure therein below atmospheric, and eventually a rather high degree of vacuum is attained. For this reason the inclosed bacteria can draw their required air supply through a coating which is only very slightly pervious to air.

The actual operations involved in preparing coated cultures according to the invention may vary considerably, but a typical and desirable form of procedure as carried out in practice for producing coated nitrobacteria cultures is substantially as follows: A good quality of peat or other humus material is dried and sifted to secure a fine granular carrier material of uniform character. As before pointed out, peat or humus material broadly is especially suited for the purposes of the invention because it contains nitrogen which though ordinarily unavailable, can readily be made available as food for beneficial soil bacteria, especially nitro-bacteria. For this reason and also because, generally speaking, a mildly alkaline reaction favors the growth of the bacteria, the reaction of the peat, if acid, may be corrected by adding thereto the proper amount of lime or other alkaline or antacid agent. The addition of wood ashes is particularly to be recommended. The peat may be rendered still more favorable to bacterial growth by addition of other bacterial food and stimulants as above set forth.

After this preliminary treatment, or simultaneously therewith, the humus material is inoculated; and in this typical example it is inoculated with a mixed culture of nitrobacteria, comprising ammonifying bacteria, nitrifying bacteria, and nitrogen-fixing bacteria (e. g. *Pseudomonas radicicola* and azotobacter), this combination of bacteria having been found especially advantageous in practice. Other beneficial nitrogen-fixing bacteria above referred to as not specifically identified, but which are obtainable from various kinds of soil and which I have found to exercise a distinctly favorable effect on the development of other nitro-bacteria when associated therewith, may be included in the mixed culture to advantage, but this is not essential. One way of conveniently accomplishing the inoculation is by impregnating the prepared peat with a liquid nutrient medium containing the mixed culture grown, for example, by the methods of my prior patents aforesaid. The inoculated peat is next dried cautiously in a suitable pan until the particles or granules of peat will freely separate; but complete drying or desiccation of the material is to be avoided for reasons before explained. In using peat, however, there is not much danger of excessive drying because of the tenacity with which peat holds moisture. The pan is then revolved, and the operation of coating the granules begins. In the present example, agar-agar is employed as the coating agent. Liquid agar-agar jelly is prepared in the usual manner by heating agar-agar with water until a readily fluent homogeneous mixture is obtained. After cooling to a temperature at which the bacteria will not be injured, say about blood heat (37° C.), the liquid jelly is gradually poured into the revolving pan until the humus granules have taken up about all they will. The mass is then partly dried in the revolving pan to remove excess moisture, yielding granules both impregnated and coated with agar-agar. Most desirably the granules are given two more coatings in the same way already described for the first coat. A little drying powder, such as powdered talcum or chalk, added to the mass in the pan, and application of a warm air blast serve to hasten the drying of the mass. Talcum and chalk are also useful to prevent the coated granules from sticking together and to cover the final coating thoroughly. It is desirable also to add a little powdered boric acid or borax to the material during the drying. This does not hurt the inclosed bacteria and is effective in keeping the material from molding while drying out and before it is placed in cans for shipment. Furthermore boric acid and borax also act as good lubricants in the pan, separating the granules as they are being dried and preventing their sticking to the pan and to each other.

The coating obtained by the use of agar-agar jelly in the manner described is particularly desirable in character. In drying, the agar-agar membrane shrinks down upon the particle or granule of material which it covers and clings to it tenaciously, conforming accurately to the contour of the protected surface. Moreover the coating is strong and tough, resistant, and neutral. When, as in the case of a fertilizer, the coated particle is applied to soil and exposed to a moist environment, the agar-agar coating does not immediately disintegrate, but first softens and swells while still affording protection to the inclosed culture which, however, is now free to propagate through the soft jelly wall and begin its beneficial action on the soil.

Where desirable a sugar solution or glucose, either of which serves admirably as a coating agent, may replace, or may be used in conjunction with, agar-agar in the procedure above described. They have several characteristics which render them valuable for certain purposes as coating agents, among which may be noted their solubility and their nutrient properties. By reason of the latter they serve not only as protective coating agents but also as bacterial foods; while their solubility insures that the contained bacteria cultures shall be very promptly freed for action when the coated material is placed in a moist environment.

The granular inoculated material, when coated as above described, may be packaged and distributed in this form. But it is especially useful for mixing with other fertilizing materials in the proper proportions to give a suitable mixed or complete fertilizer. Such additional fertilizing materials include, for example, lime, gypsum, dolomite, acid phosphate, muriate and sulfate of potash, magnesia, basic slag, phosphate rock, tankage, humus, manure, etc. In the mixed fertilizer prepared according to the present invention, the bateria are protected from direct contact with acid or alkali matter and their growth and development are therefore unimpeded. The dust or other portions of the acid or alkali chemicals or other injurious matter contained in the added fertilizer material will not penetrate and come into contact with the delicate structure of the micro-organisms inclosed in the coated granules or particles.

It is to be noted also that, in addition to the fact that the micro-organisms in the coated granules are shielded from undesirable contact with the admixed fertilizer materials, said admixed materials, if they happen to be distinctly acid or basic in reaction, act as a further protection to prevent access of undesirable foreign micro-organisms to the beneficial micro-organisms. The inoculated material is therefore protected by a material destructive to micro-organisms; but is nevertheless shielded from direct contact therewith.

As before stated, the invention is not limited to the mixing and distribution of beneficial bacteria or micro-organisms with chemical fertilizers. The method of coating bodies of inoculated material in the manner described constitutes broadly a desirable way of distributing bacteria and protecting them against contamination during transit, whether said inoculated material be accompanied or not by additional material of any kind. Coated bodies, pieces, granules, or particles of material inoculated with beneficial soil bacteria are useful alone for direct application to the soil. The coating not only acts as a protection during distribution, but it also acts as a protection in the soil against harmful micro-organisms. The beneficial bacteria are thus supplied with a nidus for growth from which they can propagate and produce their chemical products which are valuable in increasing the available nitrogen content of the soil and in producing acids which make available the potential plant foods of the soil itself.

The principles of this invention can also be extended to the distribution of beneficial micro-organisms for consumption by man and animals by preparing specially granulated material, inoculating it with suitable syrup solutions containing beneficial bacteria, and then coating the inoculated granules with a soluble protective material. The cultures are subsequently liberated during the process of digestion, the period required for liberation being dependent upon the solubility of the particular substance employed to coat the granular material.

While a practical way of carrying out the invention has been described above for the sake of a concrete example, it is to be understood that various changes and modifications may be introduced while still realizing the advantages of the invention to a greater or less extent. For instance, instead of proceeding as in the specific example given it is feasible to mix the inoculated carrier substance, such as peat or the like, with a protective binder such as agar-agar, syrups, etc., then to force the mixture through a perforated plate to granulate or comminute it, and finally to dry the comminuted material to a desirable extent, either with or without further treatment with protective material. The product contains active bacteria carried in a sufficiently moist medium and shielded by adherent protective material. This and all other forms of the method and product coming properly within the broad scope of the invention are contemplated herein.

What I claim is:

1. As a new article of manufacture, material inoculated with micro-organisms and protected by an adherent substance.

2. As a new article of manufacture, material inoculated with micro-organisms and provided with an adherent protective covering of colloidal material.

3. As a new article of manufacture, material inoculated with micro-organisms and coated with material of a gummy nature.

4. As a new article of manufacture, material inoculated with micro-organisms and coated with a soluble protective material.

5. As a new article of manufacture, inoculated material in granular form, protected by an adherent substance.

6. As a new article of manufacture, inoculated material in the form of discrete particles or granules, each provided with an adherent protective coating.

7. As a new article of manufacture, inoculated material in the form of discrete particles or granules, each provided with an adherent coating superficially treated to prevent the granules from sticking together.

8. As a new article of manufacture, material inoculated with beneficial micro-organisms and coated with agar-agar.

9. As a new article of manufacture, granular material inoculated with beneficial bacteria and protected by a substance of gum-like character.

10. As a new article of manufacture a culture of nitro-bacteria in active condition provided with an adherent coating of protective material.

11. As a new article of manufacture a relatively moist medium inoculated with nitro-bacteria in virulent condition and provided with an adherent coating of protective material.

12. A fertilizer composition comprising pieces or particles of inoculated material provided with an adherent protective coating.

13. A fertilizer composition comprising pieces or particles of material inoculated with bacteria beneficial to soil and coated with a protective substance, and additional fertilizer material mixed therewith.

14. A fertilizer composition comprising granular material inoculated with suitable nitro-bacteria and provided with a protective coating, and additional fertilizer material mixed therewith.

15. A fertilizer composition comprising granular material of relatively high moisture content inoculated with ammonifying, nitrifying, and nitrogen-fixing bacteria and provided with a protective coating, and a chemical fertilizer material mixed therewith.

16. A fertilizer comprising the combination, with particles or granules of humus-like material, inoculated with ammonifying, nitrifying and nitrogen-fixing bacteria and coated with a protective substance, of additional fertilizer material mixed therewith.

17. As a new manufactured product, the combination, with suitable material inoculated with useful bacteria and protected by an adherent substance, of material antagonistic to bacterial growth surrounding such protected material.

18. As a new manufactured product, the combination, with particles of a suitable material, such as peat or humus, inoculated with beneficial soil bacteria and protected by an adherent substance relatively inert in character, of a fertilizer material admixed with such protected particles and of a character unfavorable to bacterial growth.

19. As a new manufactured product, the combination, with particles of a suitable material, such as humus, inoculated with beneficial soil bacteria and coated with a protective substance relatively inert in character, of a mineral fertilizer of acid or basic reaction admixed with such coated particles.

20. The process of preparing useful bacterial products which comprises inoculating suitable material with micro-organisms, and treating the inoculated material with an adhesive protective substance.

21. The process of preparing useful bacterial products which comprises inoculating suitable material with micro-organisms, and coating the inoculated material with a gummy or colloidal substance.

22. The process of preparing useful bacterial products which comprises inoculating granular material, mixing a liquid coating substance therewith, and drying the mixture while substantially maintaining its granular form.

23. The process of preparing useful bacterial products which comprises inoculating granular material, mixing a liquid coating substance therewith, drying the mixture and adding a non-adhesive substance during the drying to maintain the granular character of the product.

24. The process of preparing useful bacterial products which comprises preliminarily treating humus material to render it non-acid in reaction, adding a nutrient thereto, inoculating the composition with a mixed culture of several varieties of nitrobacteria, mixing a liquid protective material with the inoculated mass, and drying under proper conditions to secure a granular product.

25. The process of preparing useful bacterial products which comprises preliminarily treating humus material to render it still more favorable to bacterial growth, inoculating it with a substantially liquid culture of ammonifying, nitrifying and nitrogen-fixing bacteria, drying until the inoculated material granulates, and then coating the granules with an adherent protective material.

26. The process of preparing useful bacterial products which comprises preliminarily treating humus material to render it still more favorable to bacterial growth, inoculating it with a substantially liquid culture of ammonifying, nitrifying and nitrogen-fixing bacteria, drying until the inoculated material granulates, and then coating the granules with agar-agar.

27. The process of preparing a mixed fertilizer which comprises inoculating a suitable material with beneficial soil bacteria, coating the inoculated material with a protective substance, and mixing the resultant product with other material having fertilizing value.

In testimony whereof I hereunto affix my signature.

GEORGE H. EARP-THOMAS.